(No Model.) 2 Sheets—Sheet 1.

C. SKINNER.
CRUSHING MACHINE.

No. 591,890. Patented Oct. 19, 1897.

Witnesses:
Clifford N. White,
C. J. Shipley

Inventor:
Courtland Skinner
By Walter N. Chamberlin
Atty

THE NORRIS PETERS CO., PHOTO-LITHO., WASHINGTON, D. C.

(No Model.) 2 Sheets—Sheet 2.
C. SKINNER.
CRUSHING MACHINE.
No. 591,890. Patented Oct. 19, 1897.
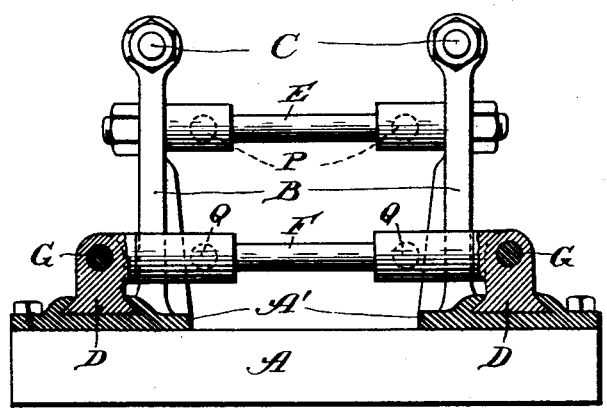
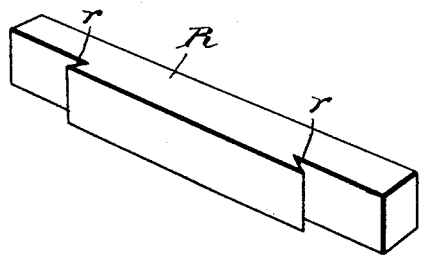
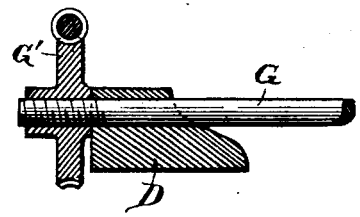
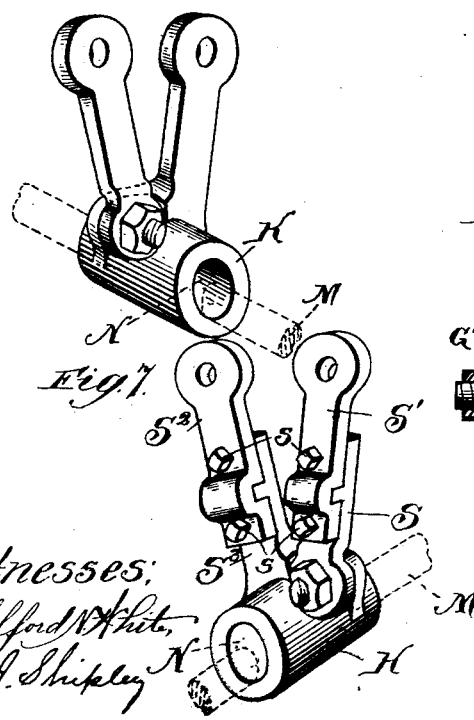

UNITED STATES PATENT OFFICE.

COURTLAND SKINNER, OF BARABOO, WISCONSIN.

CRUSHING-MACHINE.

SPECIFICATION forming part of Letters Patent No. 591,890, dated October 19, 1897.

Application filed January 6, 1894. Serial No. 495,987. (No model.)

*To all whom it may concern:*

Be it known that I, COURTLAND SKINNER, a citizen of the United States, residing at Baraboo, county of Sauk, State of Wisconsin, have invented a certain new and useful Improvement in Crushing-Machines; and I declare the following to be a full, clear, and exact description of the same, such as will enable others skilled in the art to which it pertains to make and use the same, reference being had to the accompanying drawings, which form a part of this specification.

My invention has for its object the production of a stone-crusher which shall be simple in operation; one in which the linings of the jaws can be easily replaced; one in which the adjustment to regulate the size of the product is simple, and one which, by virtue of the movement of the jaws, will not clog or choke up.

The invention consists in a combination of devices and appliances hereinafter described and claimed.

Figure 1:
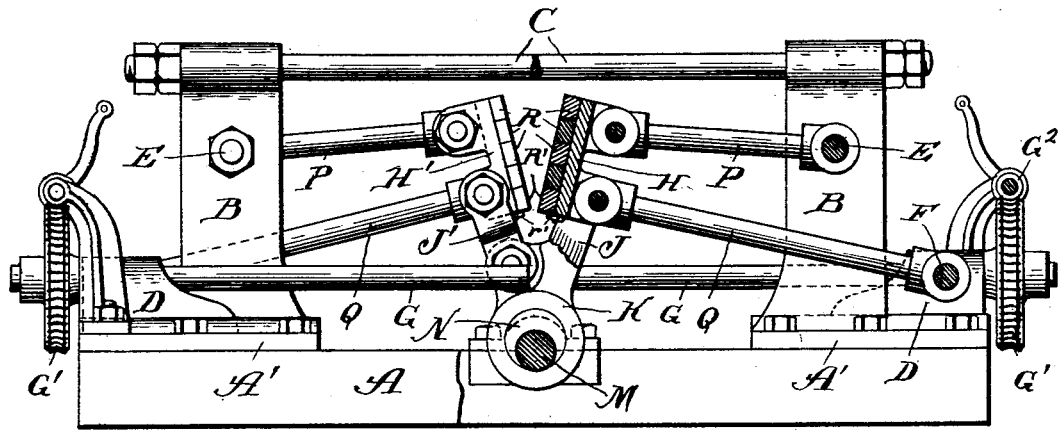
Figure 2:
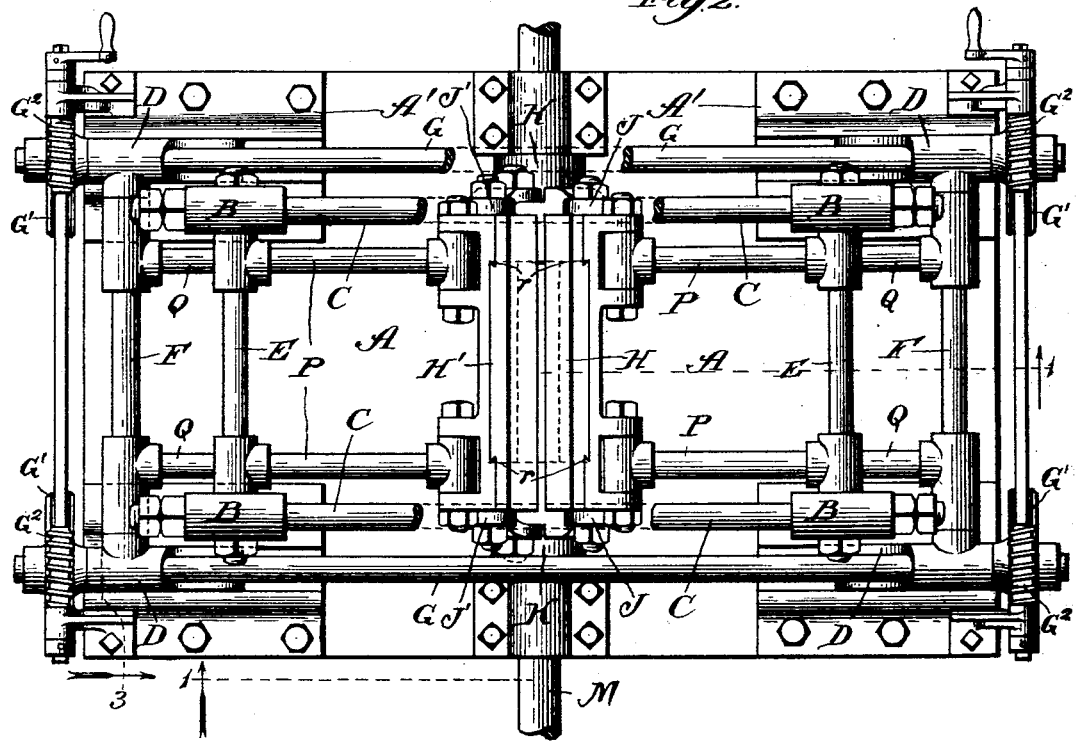

In the drawings, Figure 1 is a side elevation, with parts in section, of a machine embodying my invention. Fig. 2 is a plan view. Fig. 3 is a section on the line 3 3 of Fig. 2. Figs. 4, 5, and 6 are details. Fig. 7 is a view of a variation.

In carrying out the invention, A represents the bed of the machine, having rigidly secured thereto the plates A'. B are the uprights, rigidly secured to said plates or made a part thereof. These uprights are securely braced by the rods C, connecting them together, and inasmuch as the strain on the uprights is one tending to separate them, the rods C, together with the rods G, hereinafter described, carry most of the strain.

D are what may be termed "blocks," held by the dovetailed engagement $d$, Fig. 3, to the plates A'.

The two uprights on each end of the machine are connected together by the rods E, and the two blocks D on each end are connected together by the rods F. The two blocks on each side of the machine are connected together by the rods G (shown in detail in Fig. 6) and the blocks are made adjustable toward and from each other by the wheels G' on the end of the rods, worms G² meshing with the teeth on the periphery of the wheels G' and cranks for revolving the worms. The wheels being threaded to the rods G, when the wheels are revolved the blocks will be adjusted.

H H' are the jaws of the machine, supported at each end by the uprights J J'. (Shown in Fig. 4.) As will be seen, the upright or support J is integral with or keyed to the sleeve K, while the support J' is pivoted thereto.

M is the main shaft of the machine and is provided within each sleeve K with an eccentric or cam N. Thus it will be seen that when the shaft is revolved the eccentrics will give the supports J J' a vertical motion. Extending from each end of the upper edge of each jaw to the rod. E is the rod P and extending from each end of the lower edge of each jaw to the rod F is the rod Q. Thus as will be seen the jaws are supported vertically by the supports J J' and are braced laterally by the rods P Q. Consequently as the eccentrics cause the supports to move vertically, the jaws will be moved vertically at the same time, while simultaneously the upper edge of the jaws takes a line of movement in the arc described by the end of the rod P and the lower edge takes a line in the arc described by the rod Q. It will thus be seen that by virtue of the relative pivotal points of the outer ends of the rods P Q (the vertical distance between the outer ends being greater than the vertical distance between the ends at the crushing-heads) and also by virtue of the relative lengths of the rods P Q, the lower edges of the jaws will have a greater motion toward and from each other than will the upper edges of the jaws; or, in other words, while each edge of each jaw has a vertical movement, the lower edge of the jaws will have a greater lateral movement than the upper edge; or, to use the technical term, the "throw" will be greater at the lower edge than at the upper. The power consumed in obtaining this greater throw at the bottom is, however, compensated by the greater length of the lower arms. This greater throw at the bottom is desirable in this form of machine since it is necessary, in order to prevent clogging, that the greatest amount of crushing take place at the lower edges of the jaws. By the adjustment above described the size of the product can be easily regulated, even while the machine is in motion.

Another important feature of my invention is the lining for the crushing-jaws. As will be seen, the greatest amount of work will be done at the lower edge of the jaws, and the greatest amount of wear will therefore take place at this point. Instead of making the lining of a single piece, I make it of several strips R. (Shown in detail in Fig. 5.) These strips are engaged to the main plate of the jaw by a dovetailed engagement $r$. The strips are held vertically in place by any suitable catch—as, for instance, that shown at $r'$, Fig. 1. Now as will be seen, the lower strip R' will be worn out first. When this happens, the catch is withdrawn, the strip R' dropped out, the others allowed to settle down, and a new strip put into the top. Thus each strip is utilized to its maximum capacity before it is discarded.

In Fig. 7 I have shown a slight variation, inasmuch as the arms J J', instead of being each a single piece, each is divided into two sections S S' S² S³. These sections are held together by bolts $s$ and the connection is still further strengthened by the projection $j'$, entering a corresponding recess in the other section. Now as will be seen, by supplying with the machine various lengths of sections S' S² the distance between the jaws and the eccentric can be easily regulated and the proportionate throw between the upper and lower edges of the jaws be regulated—that is to say, the length of the brace-rods being the same and the length of the vertical supports being altered, the difference between the throw of the lower edge and that of the upper edge will be altered or varied. Thus the machine can be easily and quickly altered to suit a large variety of materials and grades of rock.

It is obvious that various details of my machine might be altered or changed without departing from the spirit of the invention.

What I claim is—

1. In a crushing-machine the combination of two jaws, a single set of eccentric mechanism below the jaws for moving both the jaws vertically and simultaneously and brace-rods pivoted to the upper and lower edges of the jaws and having their opposite ends pivoted to stationary points, whereby the jaws are moved laterally simultaneously with the vertical movement, substantially as described.

2. In a crushing-machine the combination of two crushing-jaws, a single set of eccentric mechanism for moving both the jaws vertically and simultaneously and brace-rods pivoted to the upper and lower edges of the jaws and pivotally engaged to stationary points at the opposite ends, the outer or stationary ends of the lower rods being adjustable, substantially as described.

3. In a crushing-machine the combination of two crushing-jaws, vertical supports pivotally engaged to the jaws, and engaged also with a single set of eccentric mechanism to give them a simultaneous vertical movement, and lateral supports consisting of rods pivoted to the upper and lower edges of the jaws and pivoted to stationary points, at least a portion of the pivotal points being adjustable substantially as described.

4. In a crushing-machine the combination of two jaws, a driving-shaft below the jaws, eccentrics on the shaft connected with the jaws, brace-rods pivoted to the upper edge of the jaws and pivoted to the bed of the machine and longer brace-rods pivoted to the lower edge of the jaws and pivoted to the bed of the machine, said latter rods made adjustable, substantially as described.

5. The combination of the jaws H H', supports J J', eccentrics N, uprights B, rods P pivoted thereto, blocks D, rods Q pivoted thereto, rods C and rods G, and means for moving the blocks D toward or from those on the opposite end of the machine, substantially as described.

In testimony whereof I sign this specification in the presence of two witnesses.

COURTLAND SKINNER.

Witnesses:
CHARLES E. MARTIN,
E. N. MARSH.